US008072990B1

(12) United States Patent
Tuvell et al.

(10) Patent No.: US 8,072,990 B1
(45) Date of Patent: Dec. 6, 2011

(54) HIGH-AVAILABILITY REMOTE-AUTHENTICATION DIAL-IN USER SERVICE

(75) Inventors: Walter Tuvell, Reading, MA (US); Oliver Tavakoli, Sudbury, MA (US); Thomas C. Porcher, Stow, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 378 days.

(21) Appl. No.: 11/738,095

(22) Filed: Apr. 20, 2007

(51) Int. Cl.
*H04L 12/56* (2006.01)
(52) U.S. Cl. .................................... 370/401; 709/217
(58) Field of Classification Search .................. None
See application file for complete search history.

(56) References Cited

U.S. PATENT DOCUMENTS

| 7,035,911 | B2 * | 4/2006 | Lowery et al. | 709/217 |
| 2004/0073651 | A1 * | 4/2004 | Beaulieu et al. | 709/223 |
| 2005/0078681 | A1 * | 4/2005 | Sanuki et al. | 370/395.5 |
| 2005/0235000 | A1 * | 10/2005 | Keil | 707/200 |
| 2007/0123253 | A1 * | 5/2007 | Simongini et al. | 455/433 |
| 2007/0220038 | A1 * | 9/2007 | Crago | 707/102 |
| 2008/0075085 | A1 * | 3/2008 | Tsuge et al. | 370/392 |
| 2008/0130647 | A1 * | 6/2008 | Ohba et al. | 370/392 |

OTHER PUBLICATIONS

C.R. Livingston, et al., "Remote Authentication Dial in User Services (RADIUS)," Internet Engineering Task Force, Request for Comment 2058, pp. 1-53, Jan. 1997.
C.R. Livingston, "RADIUS Accounting," Internet Engineering Task Force, Request for Comment 2059, pp. 1-21, Jan. 1997.
C.R. Livingston, et al., "Remote Authentication Dial in User Services (RADIUS)," Internet Engineering Task Force, Request for Comment 2138, pp. 1-54, Apr. 1997.
C.R. Livingston, "RADIUS Accounting," Internet Engineering Task Force, Request for Comment 2139, pp. 1-21, Apr. 1997.
G. Zorn, "Microsoft Vendor-specific RADIUS Attributes," Internet Engineering Task Force, Request for Comment 2548, pp. 1-34, Mar. 1999.
B. Aboba et al., "RADIUS Authentication Client MIB," Internet Engineering Task Force, Request for Comment 2618, pp. 1-12, Jun. 1999.
G. Zorn et al., "RADIUS Authentication Server MIB," Internet Engineering Task Force, Request for Comment 2619, pp. 1-14, Jun. 1999.
B. Aboba et al., "RADIUS Accounting Client MIB," Internet Engineering Task Force, Request for Comment 2620, pp. 1-11, Jun. 1999.
G. Zorn et al., "RADIUS Accounting Server MIB," Internet Engineering Task Force, Request for Comment 2621, pp. 1-13, Jun. 1999.
B. Aboba et al., "Implementation of L2TP Compulsory Tunneling via RADIUS," Internet Engineering Task Force, Request for Comment 2809, pp. 1-19, Apr. 2000.
C. Rigney, et al., "Remote Authentication Dial in User Service (RADIUS)," Internet Engineering Task Force, Request for Comment 2865, pp. 1-63, Jun. 2000.
C. Rigney, "RADIUS Accounting," Internet Engineering Task Force, Request for Comment 2866, pp. 1-24, Jun. 2000.

(Continued)

*Primary Examiner* — Daniel J Ryman
*Assistant Examiner* — Tito Pham
(74) *Attorney, Agent, or Firm* — Harrity & Harrity, LLP

(57) ABSTRACT

A method may include receiving, in a first server from a second server, a request for a service of a network by a device; sending, from the first server to the second server, a response to the request for the service to permit access to the service; and sending state information about the response to a third server for storage in a database.

11 Claims, 14 Drawing Sheets

OTHER PUBLICATIONS

G. Zorn et al., "RADIUS Accounting Modifications for Tunnel Protocol Support," Internet Engineering Task Force, Request for Comment 2867, pp. 1-10, Jun. 2000.

G. Zorn et al., "RADIUS Attributes for Tunnel Protocol Support," Internet Engineering Task Force, Request for Comment 2868, pp. 1-17, Jun. 2000.

C. Rigney, et al., "RADIUS Extensions," Internet Engineering Task Force, Request for Comment 2869, pp. 1-39, Jun. 2000.

D. Mitton, "Network Access Servers Requirements: Extended RADIUS Practices," Internet Engineering Task Force, Request for Comment 2882, pp. 1-14, Jul. 2000.

B. Aboba et al., "RADIUS and IPv6," Internet Engineering Task Force, Request for Comment 3162, pp. 1-10, Aug. 2001.

B. Aboba, "IANA Considerations for RADIUS," Internet Engineering Task Force, Request for Comment 3575, pp. 1-7, Jul. 2003.

M. Chiba, et al., "Dynamic Authorization Extensions to Remote Authentication Dial in User Service (RADIUS)," Internet Engineering Task Force, Request for Comment 3576, pp. 1-25, Jul. 2003.

B. Aboba et al., "RADIUS (Remote Authentication Dial in User Service) Support for Extensible Authentication Protocol (EAP)," Internet Engineering Task Force, Request for Comment 3579, pp. 1-38, Sep. 2003.

P. Congdon, et al., "IEEE 802.1X Remote Authentication Dial in User Service (RADIUS) Usage Guidelines," Internet Engineering Task Force, Request for Comment 3580, pp. 1-25, Sep. 2003.

R. Droms, et al., "Remote Authentication Dial-In User Service (RADIUS) Attributes Suboption for the Dynamic Host Configuration Protocol (DHCP) Relay Agent Information Option," Internet Engineering Task Force, Request for Comment 4014, pp. 1-7, Feb. 2005.

B. Sterman, et al., "RADIUS Extension for Digest Authentication," Internet Engineering Task Force, Request for Comment 4590, pp. 1-27, Jul. 2006.

D. Nelson, "RADIUS Authentication Client MIB for IPv6," Internet Engineering Task Force, Request for Comment 4668, pp. 1-20, Aug. 2006.

D. Nelson, "RADIUS Authentication Server MIB for IPv6," Internet Engineering Task Force, Request for Comment 4669, pp. 1-21, Aug. 2006.

D. Nelson, "RADIUS Accounting Client MIB for IPv6," Internet Engineering Task Force, Request for Comment 4670, pp. 1-19, Aug. 2006.

D. Nelson, "RADIUS Accounting Server MIB for IPv6," Internet Engineering Task Force, Request for Comment 4671, pp. 1-20, Aug. 2006.

S. DeCnodder, et al., "RADIUS Dynamic Authorization Client MIB," Internet Engineering Task Force, Request for Comment 4672, pp. 1-19, Sep. 2006.

S. DeCnodder, et al., "RADIUS Dynamic Authorization Server MIB," Internet Engineering Task Force, Request for Comment 4673, pp. 1-20, Sep. 2006.

P. Congdon, et al., "RADIUS Attributes for Virtual LAN and Priority Support," Internet Engineering Task Force, Request for Comment 4675, pp. 1-13, Sep. 2006.

V. Mammoliti, et al., "DSL Forum Vendor-Specific RADIUS Attributes," Internet Engineering Task Force, Request for Comment 4679, pp. 1-21, Sep. 2006.

J. Salowey, "RADIUS Delegated-IPv6-Prefix Attribute," Internet Engineering Task Force, Request for Comment 4818, pp. 1-6, Apr. 2007.

* cited by examiner

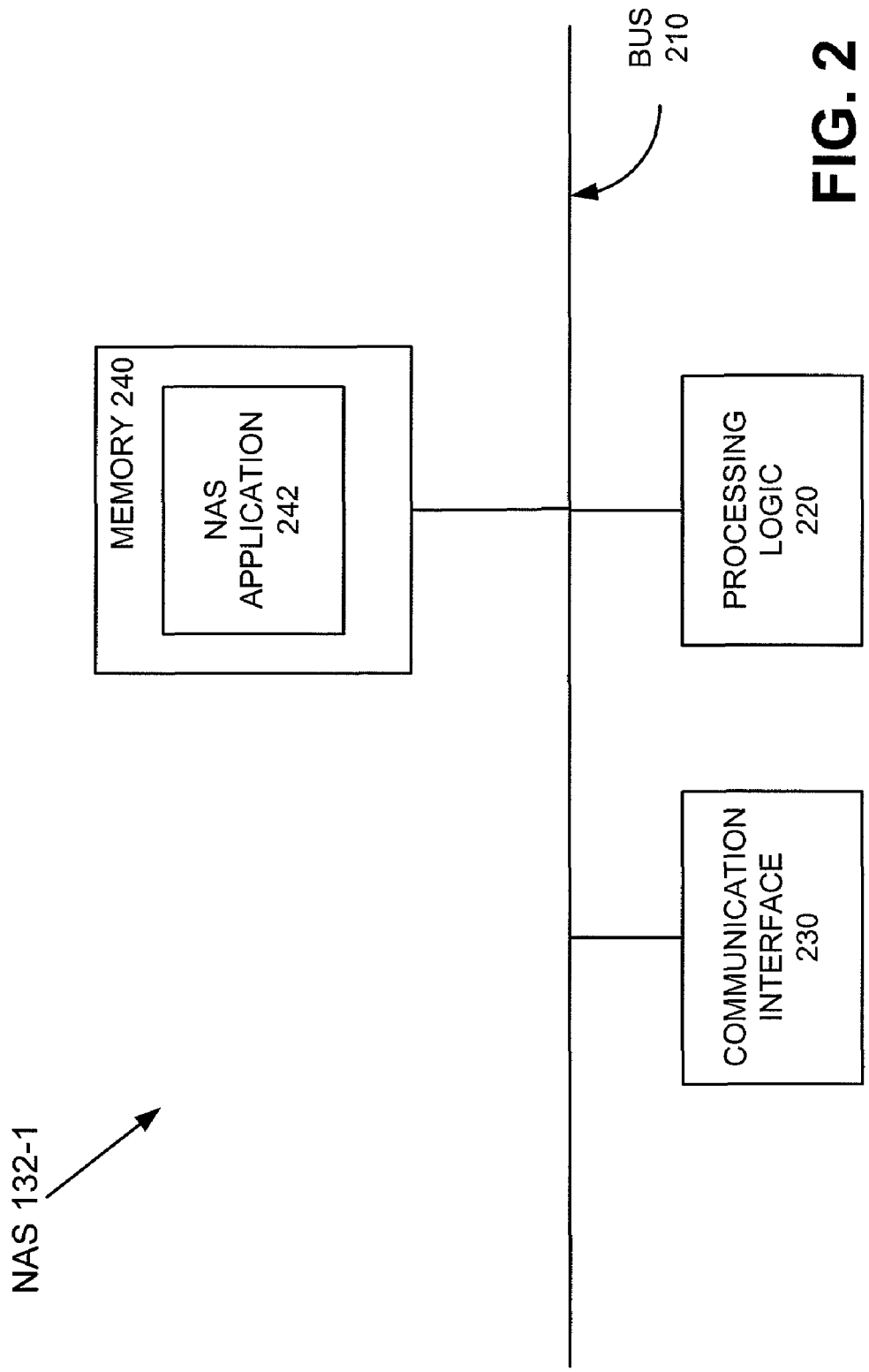

| | NETWRK ADDRESS 902 | ADDRESS POOL 904 | CACHED 906 | CACHED TO 908 | ASSIGNED 912 | TIME FREED 916 |
|---|---|---|---|---|---|---|
| 918 | 1.2.3.4 | BLUE | YES | RADIUS SERVER 142-1 | NO | |
| 920 | 1.2.3.5 | BLUE | YES | RADIUS SERVER 142-1 | NO | |
| 922 | 1.2.3.6 | BLUE | YES | RADIUS SERVER 142-1 | NO | |
| 924 | 1.2.3.7 | GOLD | NO | | YES | |
| 926 | 1.2.3.8 | GOLD | NO | | NO | 4:30 P.M. |
| 928 | 1.2.3.9 | GOLD | NO | | NO | 4:30 P.M. |
| 930 | 1.2.3.10 | GOLD | NO | | NO | 4:30 P.M. |
| 932 | 1.2.3.11 | GOLD | NO | | NO | 4:30 P.M. |

CACHED IP ADDRESS TABLE 812 (rows 918-922)

IP ADDRESS TABLE 810

FIG. 9

|  | SESSION A | SESSION 112 |
|---|---|---|
| SESSION ID | 70F864 | 70F865 |
| CREATION TIME | 9:55 A.M. | 10 A.M. |
| EXPIRATION TIME | 10 P.M. | 10 P.M. |
| NETWORK ADDRESS | 1.2.3.7 | 1.2.3.6 |
| ADDRESS POOL | GOLD | BLUE |
| STATUS | ACTIVE | ACTIVE |
| NAS ID | 1.2.3.99 | 1.2.3.99 |
| USERNAME | SMITH | JONES |
| CALLING STATION ID | 1.2.3.99 | 1.2.3.98 |
| CALLED STATION ID | 1.2.3.98 | 1.2.3.99 |
| MYRADATTR | [DATA] | [DATA] |

CST 820

FIG. 10

HIGH-AVAILABILITY REMOTE-AUTHENTICATION DIAL-IN USER SERVICE

BACKGROUND

Internet service providers (ISPs) may use the Remote Authentication Dial-In User Service (RADIUS) protocol, which is an authentication, authorization, and/or accounting system. When a user dials in or otherwise accesses an ISP, for example, the user may enter a username and a password. This information may be passed to a RADIUS server, which may check the username and password to authorize access to the ISP network and network services. The RADIUS protocol specification is maintained by a working group of the Internet Engineering Task Force (IETF) as described in RFC 2865 and 2866.

SUMMARY

According to one aspect, a method may include receiving, in a first server from a second server, a request for a service of a network by a device; sending, from the first server to the second server, a response to the request for the service to permit access to the service; and sending state information about the response to a third server for storage in a database.

According to another aspect, a method may include receiving, in a first server from a second server, a request for a connection between a device and a network; receiving, in the first server from a third server, a group of network addresses sent in response to a request for the group of network addresses; caching the group of network addresses in the first server; and sending, from the first server to the second server, one of the group of network address for the connection.

According to another aspect, a system may include a first server to receive a request for a connection between a device and a network and to send a network address for the connection in reply to the request for the connection; and a second server to receive the request for the connection from the device and to send the request for the connection to the first server; wherein the first server sends state information regarding the connection to a third server for storage in a database.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings.

FIG. 2 is a block diagram of exemplary components in a network access server;

FIG. 9 is a diagram of an exemplary network address table;

FIG. 10 is a diagram of an exemplary current sessions table;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Exemplary Environment

Figure 1A:
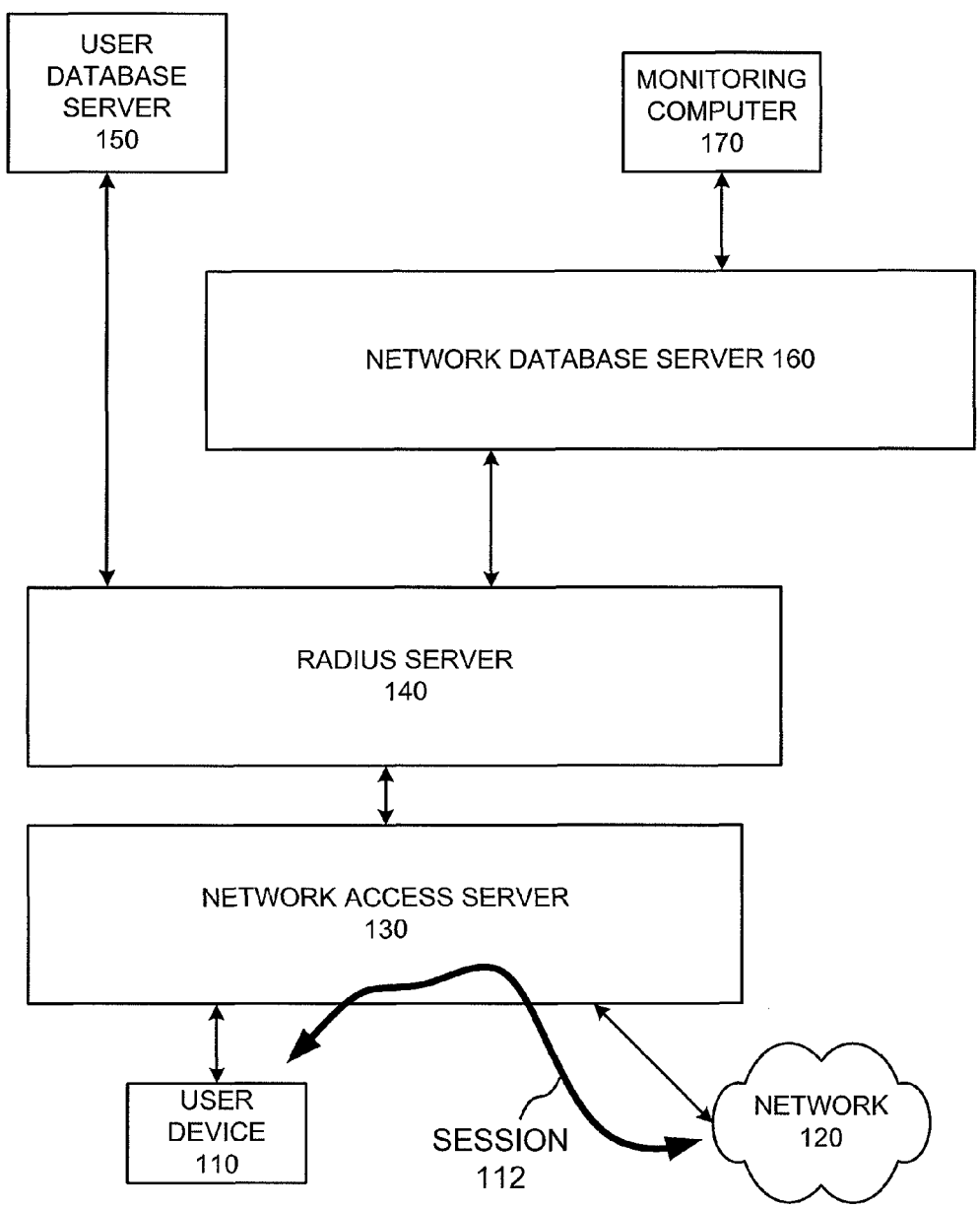
FIG. 1A is a block diagram of an exemplary environment in which systems and methods described herein may be implemented.

FIG. 1A is a diagram of an exemplary environment 100 in which systems and methods described herein may be implemented. Environment 100 may include a user device 110, a session 112, a network 120, a network access server 130 ("NAS 130"), a RADIUS server 140 ("RADIUS server 140"), a user database server 150, a network database server 160 ("NDB server 160"), and a monitoring computer 170. In practice, there may be more, different, or fewer devices or a different arrangement of devices than what is shown in FIG. 1A. For example, environment 100 may include one or more user devices. Further, while FIG. 1A shows NAS 130, RADIUS server 140, user database server 150, NDB server 160, and monitoring computer 170 in environment 100, one or more of these devices may be remotely located, e.g., the devices may be geographically diverse. Communication among user device 110, network 120, NAS 130, RADIUS server 140, user database server 150, NDB server 160, and monitoring computer 170 may be accomplished via wired and/or wireless communication connections. Although arrows in FIG. 1A may indicate communication directly between devices, communication may be indirect. Further, although NAS 130, RADIUS server 140, and NDB server 160 may be referred to as a "server," the term "server" as used herein means any type of computer.

User device 110 may include a mobile telephone, a landline telephone, or a computer, such as a server, a desktop, or a laptop. User device 110 may communicate with NAS 130 for the purposes of establishing session 112 with network 120. Session 112 may be a lasting connection between user device 110 and network 120 that may, for example, involve the exchange of many packets between user device 110 and network 120. Session 112 may include, for example, a telephone call or a web browsing session. Although user device 110 may communicate with NAS 130 via any type of wired and/or wireless communication connections, in one embodiment, user device 110 may communicate with NAS 130 via a public switched telephone network (PSTN). In another embodiment, user device 110 communicates with NAS 130 via a mobile telephone network. In yet another embodiment, user device 110 may communicate with NAS 130 via the Internet. User device 110 may be associated with a user and a username, e.g., the username may identify user device 110 and the user of user device 110, and vice versa. In other embodiments, user device 110 is not necessarily associated with any particular username.

Network 120 may include a wide-area network (WAN), e.g., the Internet, a local-area network, a telephone network, e.g., the Public Switched Telephone Network (PSTN), an intranet, a private corporate network, or a combination of networks. Network 120 may provide services, such as applications and/or content, to user devices, such as user device 110.

NAS 130 may communicate with user devices, such as user device 110, and provide access to network 120 for sessions, such as session 112. NAS 130 may communicate with RADIUS server 140 to request connections to network 120 for user devices. For example, NAS 130 may pass information about user device 110, such as a username and password (associated with user device 110), to RADIUS server 140 for authentication of user device 110 to establish session 112.

RADIUS server 140 may receive requests from NAS 130 for user devices to connect to network 120. For example, RADIUS server 140 may receive information from NAS 130 to authenticate user device 110 to establish session 112. RADIUS server 140 may communicate with user database server 150 to query user names, user passwords, and/or privileges associated with a user device, such as user device 110. RADIUS server 140 may also communicate with NDB server 160 to store information regarding session 112 and user device 110, for example.

User database server 150 may include a user database that may specify what user devices and/or usernames may establish sessions with network 120. The user database may also specify what privileges user devices and/or usernames have to access services provided by network 120, for example.

NDB server 160 may store information regarding user device sessions, such as session 112. NDB server may also store network addresses, such as Internet protocol ("IP") addresses, for assignment to user devices, such as user device 110 for session 112. Monitoring computer 170 may monitor the data stored by NDB server 160. For example, monitoring computer 170 may include a billing application that retrieves information about user sessions and generates bills.

Figure 1B:
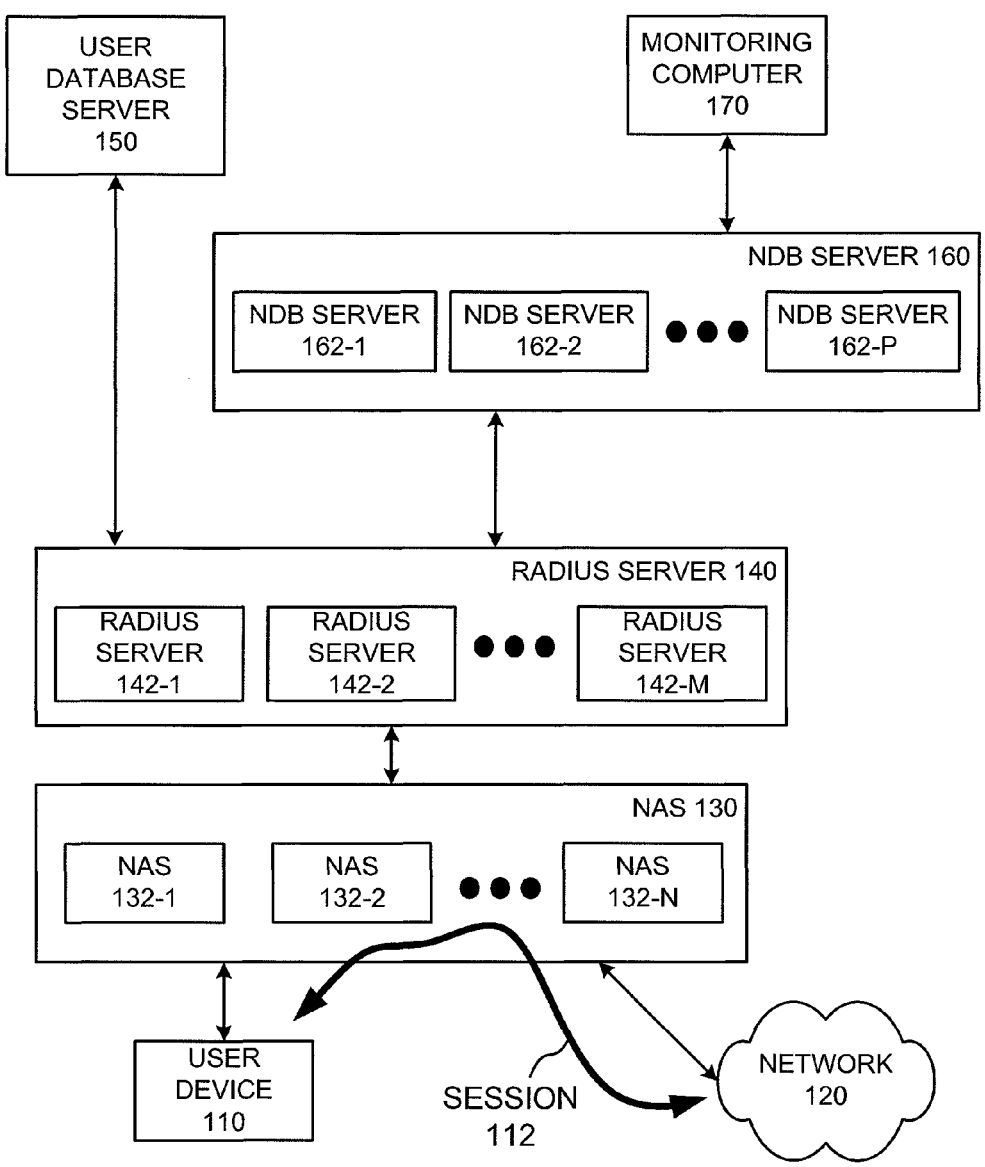
FIG. 1B is a more detailed block diagram of an exemplary environment in which systems and methods described herein may be implemented.

FIG. 1B is a more detailed block diagram of exemplary environment 100 in which systems and methods described herein may be implemented. NAS 130 may include one or more network access servers, such as NAS 132-1 through NAS 132-N, where N≧1. In one embodiment, NAS 132-1 through 132-N may be co-located. In another embodiment, one or more of NASs 132-1 through 132-N may be remotely located, e.g., NASs 132-1 through 132-N may be geographically diverse. As such, NAS 130 may be implemented to improve the availability of services and may be referred to as a "highly-available cluster" or "HA cluster." In one implementation, NAS 132-1 through 132-N may be redundant so that NAS 130 may provide services even when one or more of NAS 132-1 through 132-N fail.

RADIUS server 140 may include one or more RADIUS servers, such as RADIUS server 142-1 through 142-M, where M≧1. In one embodiment, RADIUS servers 142-1 through 142-M may be co-located. In another embodiment, one or more RADIUS servers 142-1 through 142-M may be remotely located, e.g., RADIUS servers 142-1 through 142-M may be geographically diverse. RADIUS servers 142-1 through 142-M may form an HA cluster. In one implementation, RADIUS servers 142-1 through 142-M may be redundant so that RADIUS server 140 may provide service even when one or more of RADIUS servers 142-1 through 142-M fail.

NDB server 160 may include one or more network database servers, such as NDB server 162-1 through NDB server 162-P, where P≧1. In one embodiment, NDB servers 162-1 through 162-P may be co-located. In another embodiment, one or more NDB servers 162-1 through 162-P may be remotely located, e.g., NDB servers 162-1 through 162-P may be geographically diverse. NDB servers 162 may form an HA cluster. In one implementation, NDB servers 162 may be redundant so that NDB server 160 may provide service even when one or more of NDB servers 162-1 through 162-M fail. Any database stored by NDB server 160 may be redundantly distributed over NDB servers 162-1 through 162-P such that the failure of any one of NDB servers 162-1 through 162-P may not result in the loss of any data.

Network Access Server

FIG. 2 is a block diagram of exemplary components in NAS 132-1. NAS 132-2 through NAS 132-N may each be similarly configured. As shown in FIG. 2, NAS 132-1 may include a bus 210, processing logic 220, a communication interface 230, and a memory 240. NAS 132-1 may include other components (not shown) that aid in receiving, transmitting, and/or processing data. Moreover, other configurations of components in NAS 132-1 are possible.

Bus 210 may include a path that permits communication among the components of NAS 132-1. Processing logic 220 may include any type of processor or microprocessor that interprets and executes instructions. In other embodiments, processing logic 220 may include an application specific integrated circuit (ASIC), field programmable gate array (FPGA), or the like.

Communication interface 230 may include any transceiver-like mechanism that enables NAS 132-1 to communicate with other devices and/or systems. In one implementation, communication interface 230 may allow for NAS 132-1 to be controlled and/or administered remotely by an operator or an administrator.

Memory 240 may include a random access memory (RAM) or another type of dynamic storage device that may store information and instructions for execution by processing logic 220; a read only memory (ROM) device or another type of static storage device that may store static information and instructions for use by processing logic 220; and/or some other type of magnetic or optical recording medium and its corresponding drive for storing information and/or instructions. Memory 240 may store NAS application 242. NAS application 242 may include instructions for causing NAS 132-1 to implement the RADIUS protocol to establish sessions between user devices and network 120.

NAS 132-1 may perform certain operations, as described in detail below. NAS 132-1 may perform these operations in response to processing logic 220 executing software instructions contained in a computer-readable medium, such as memory 240. A computer-readable medium may be defined as a physical or logical memory device and/or carrier wave. The software instructions may be read into memory 240 from another computer-readable medium or from another device via communication interface 230. The software instructions contained in memory 240 may cause processing logic 220 to perform processes that are described below.

Radius Server

Figure 3:
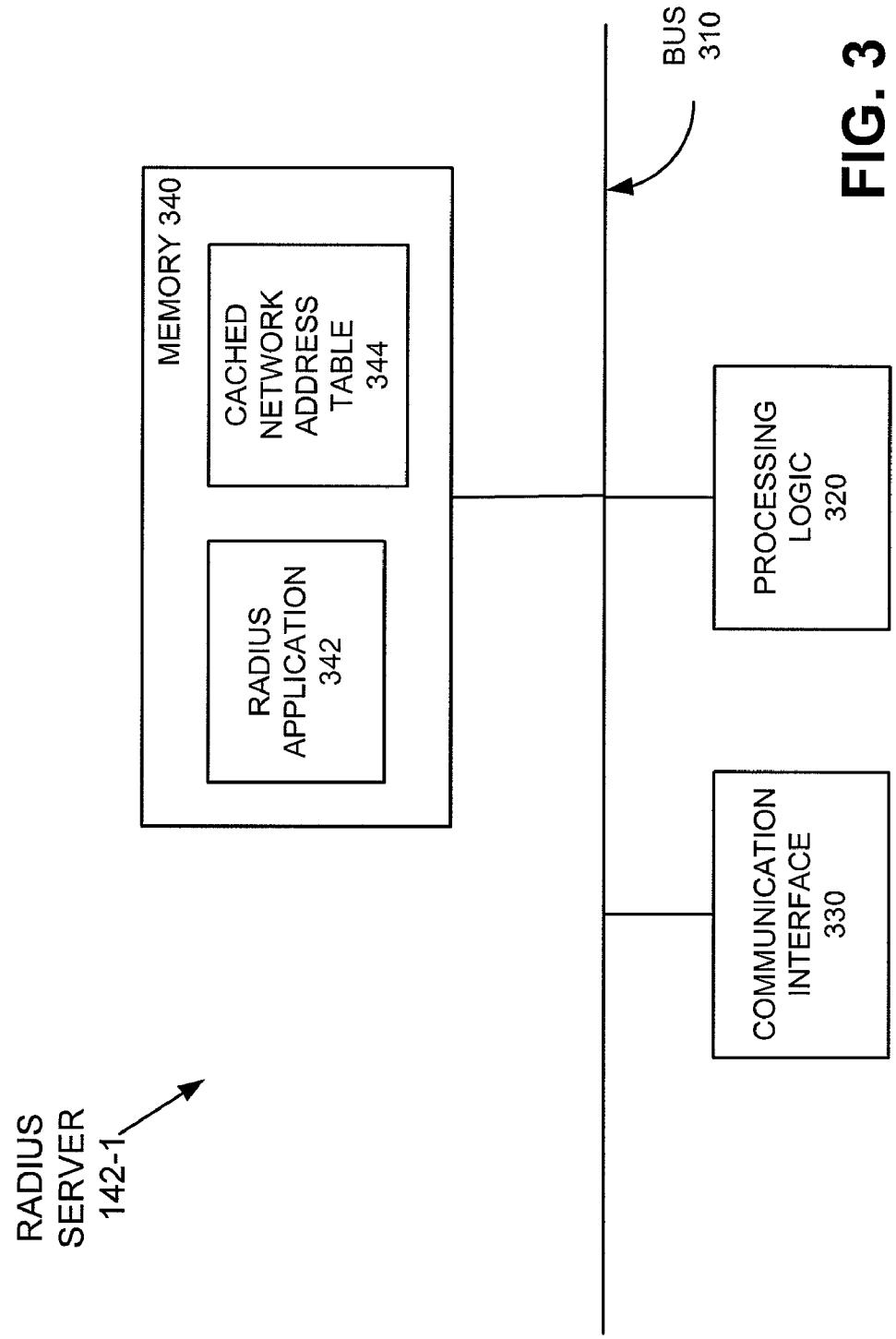
FIG. 3 is a block diagram of exemplary components in a RADIUS server.

FIG. 3 is a block diagram of exemplary components in RADIUS server 142-1. RADIUS server 142-2 through RADIUS server 142-M may each be similarly configured. As shown in FIG. 3, RADIUS server 142-1 may include a bus 310, processing logic 320, a communication interface 330, and a memory 340. RADIUS server 142-1 may include other components (not shown) that aid in receiving, transmitting, and/or processing data. Moreover, other configurations of components in RADIUS server 142-1 are possible.

Bus 310 may include a path that permits communication among the components of RADIUS server 142-1. Processing logic 320 may include any type of processor or microprocessor that interprets and executes instructions. In other embodiments, processing logic 320 may include an ASIC, FPGA, or the like.

Communication interface 330 may include any transceiver-like mechanism that enables RADIUS server 142-1 to communicate with other devices and/or systems. In one implementation, communication interface 330 may allow for RADIUS server 142-1 to be controlled and/or administered remotely by an operator or administrator.

Memory 340 may include a RAM or another type of dynamic storage device that may store information and instructions for execution by processing logic 320; a ROM device or another type of static storage device that may store static information and instructions for use by processing logic 320; and/or some other type of magnetic or optical recording medium and its corresponding drive for storing information and/or instructions. Memory 340 may store RADIUS application 342. RADIUS application 342 may allow RADIUS server 142-1 to implement the RADIUS protocol to establish sessions between user devices, such as user device 110, and network 120. Memory 340 may also store a cached network address table 344, described below with respect to FIG. 4. Cached network address table 344 may allow RADIUS server 142-1 to assign network addresses to user devices, such as user device 110.

RADIUS server 142-1 may perform certain operations, as described in detail below. RADIUS server 142-1 may perform these operations in response to processing logic 320 executing software instructions contained in a computer-readable medium, such as memory 340. The software instructions may be read into memory 340 from another computer-readable medium or from another device via communication interface 330. The software instructions contained in memory 340 may cause processing logic 320 to perform processes that are described below.

Figure 4:
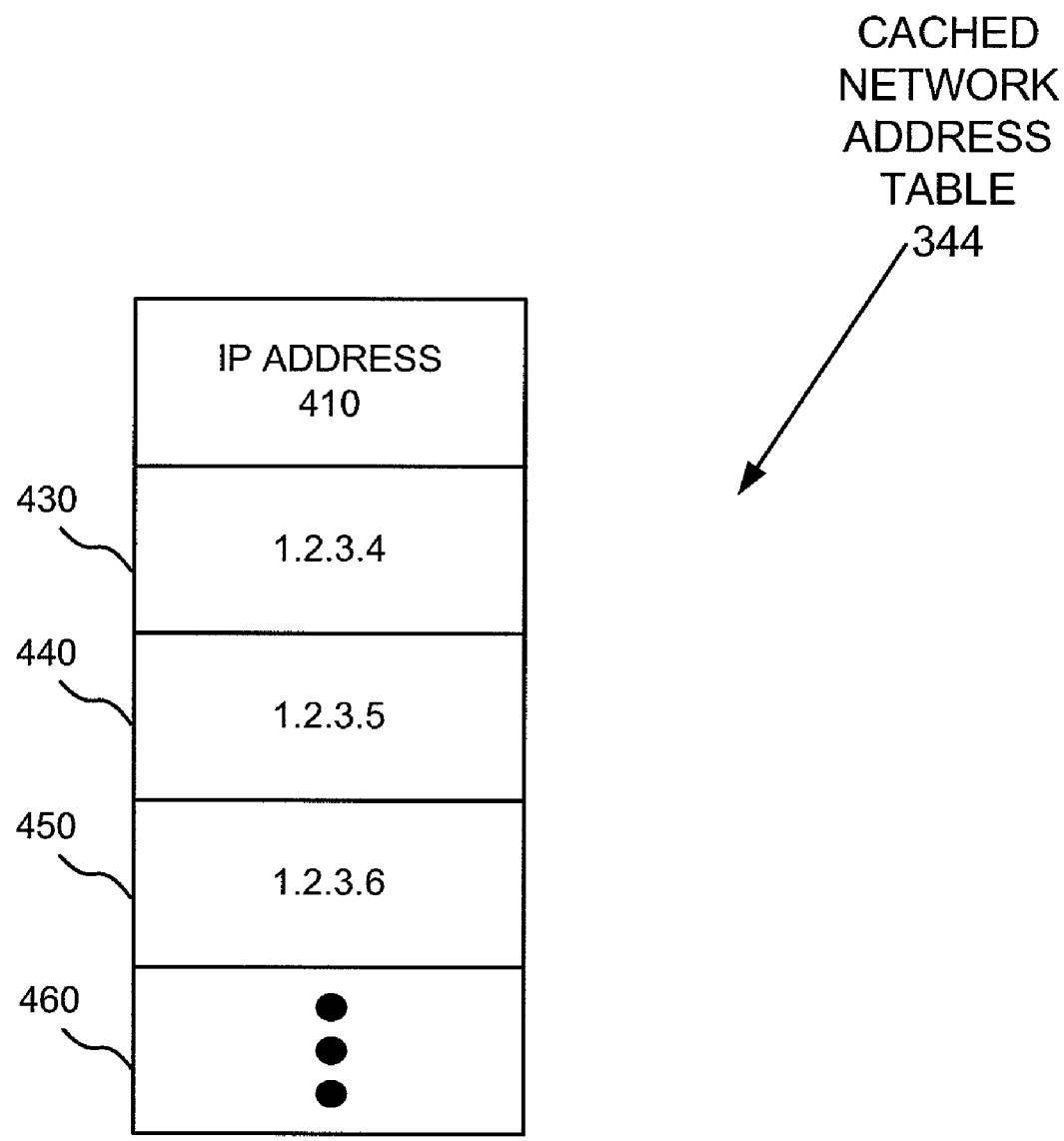
FIG. 4 is a diagram of an exemplary cached network address table.

FIG. 4 is a diagram of an exemplary cached network address table 344. As illustrated, cached network address table 344 may include a network address field 410. Cached network address table 344 may include additional, different, or fewer fields than illustrated in FIG. 4. Network address field 410 may include network addresses that RADIUS server 142-1 may provide to NAS 130 when RADIUS server 142-1 receives a request from NAS 130 for a network address to establish a new session for a user device with network 120. In the exemplary embodiment of FIG. 4, table 344 includes three records 430, 440, and 450 with the following network addresses in network address field 410: 1.2.3.4, 1.2.3.5, and 1.2.3.6.

User Database Server

Figure 5:
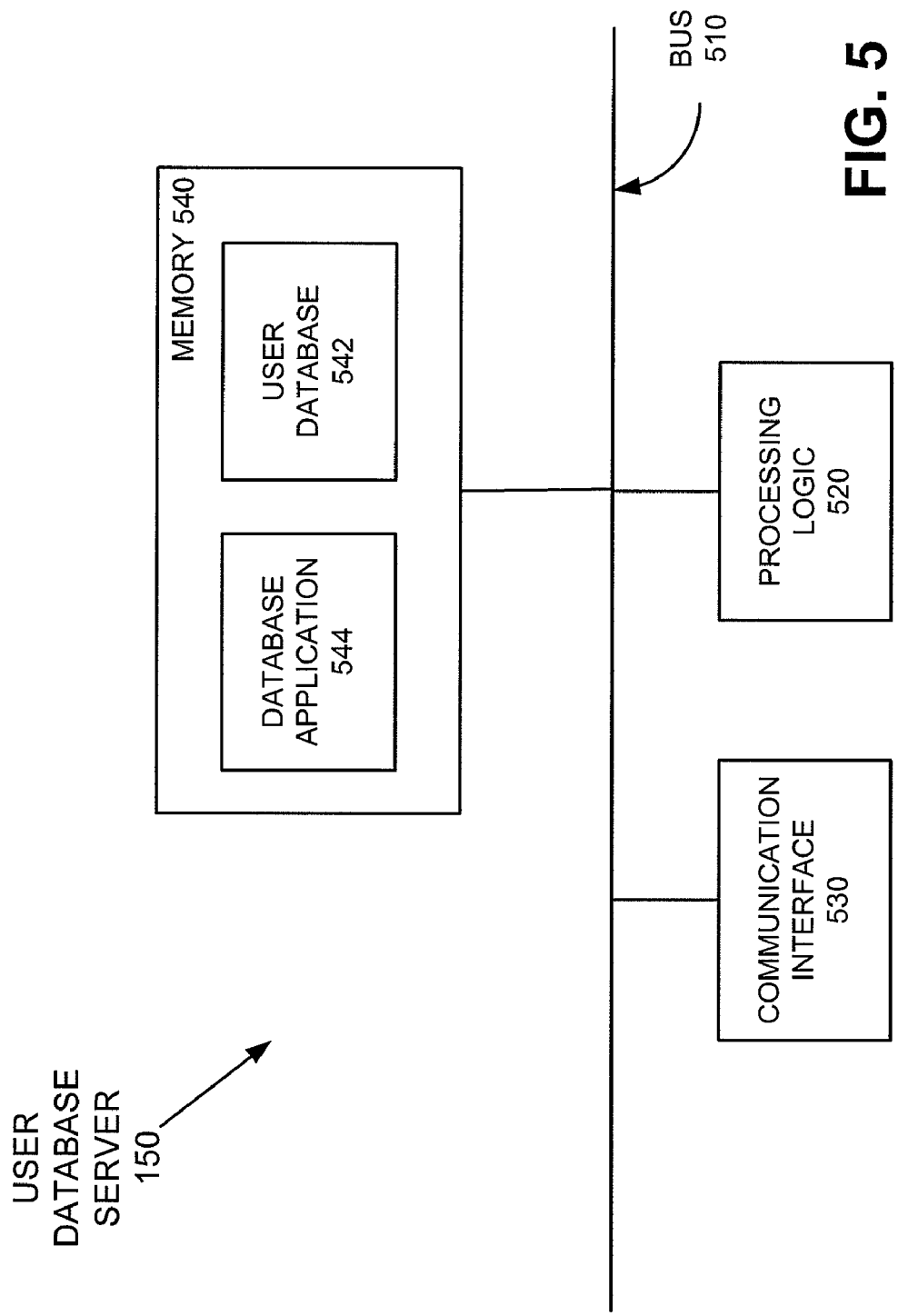
FIG. 5 is a block diagram of exemplary components in a user database server.

FIG. 5 is a block diagram of exemplary components in user database server 150. As shown in FIG. 5, user database server 150 may include a bus 510, processing logic 520, a communication interface 530, and a memory 540. User database server 150 may include other components (not shown) that aid in receiving, transmitting, and/or processing data. Moreover, other configurations of components in user database server 150 are possible.

Bus 510 may include a path that permits communication among the components of user database server 150. Processing logic 520 may include any type of processor or microprocessor that interprets and executes instructions. In other embodiments, processing logic 520 may include an ASIC, FPGA, or the like.

Communication interface 530 may include any transceiver-like mechanism that enables user database server 150 to communicate with other devices and/or systems. Communication interface 530 may allow for user database server 150 to be controlled and/or administered remotely by an operator or administrator.

Memory 540 may include a RAM or another type of dynamic storage device that may store information and instructions for execution by processing logic 520; a ROM device or another type of static storage device that may store static information and instructions for use by processing logic 520; and/or some other type of magnetic or optical recording medium and its corresponding drive for storing information and/or instructions. Memory 540 may store a user database 542, described below with respect to FIG. 6. User database 542 may include data regarding user devices that may access network 120, such as user device 110. Such data may include, for example, rights and privileges of user devices. Memory 540 may store a database application program 544 to manage user database 542.

User database server 150 may perform certain operations, as described in detail below. User database server 150 may perform these operations in response to processing logic 520 executing software instructions contained in a computer-readable medium, such as memory 540. The software instructions may be read into memory 540 from another computer-readable medium or from another device via communication interface 530. The software instructions contained in memory 540 may cause processing logic 520 to perform processes that are described below.

Figure 6:
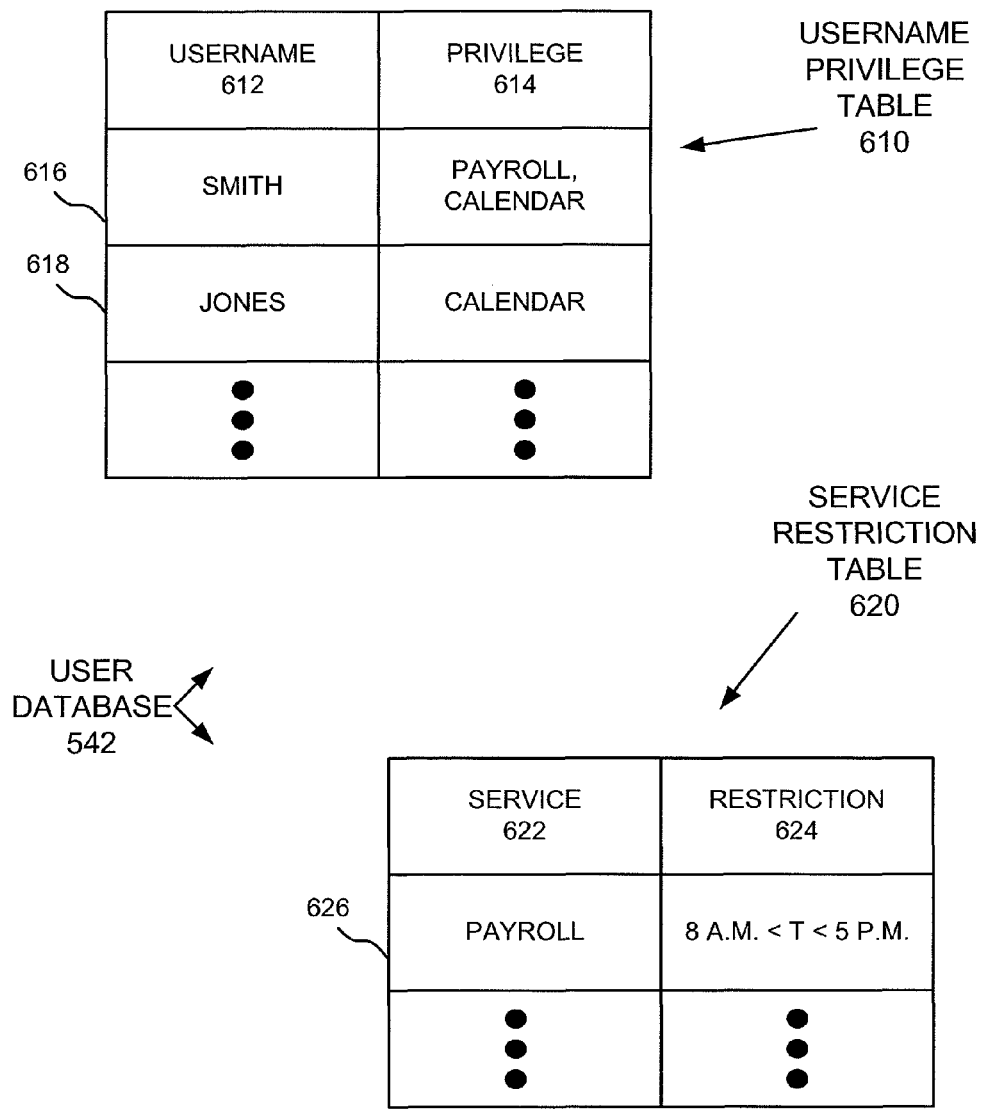
FIG. 6 is a diagram of an exemplary user database.

FIG. 6 is a diagram of an exemplary user database 542. As illustrated, user database 542 may include user privilege table 610 and service restriction table 620. User privilege table 610 may include username field 612 and privilege field 614. User privilege table 610 may include additional, different, or fewer fields than illustrated in FIG. 6. Username field 612 may include the usernames that may have access to network 120, for example. Privilege field 614 may include one or more privileges associated with the corresponding usernames in username field 612. For example, privilege field 614 may indicate services that a username may access in network 120. Service restriction table 620 may include service field 622 and restriction field 624. Service restriction table 620 may include additional, different, or fewer fields than illustrated in FIG. 6. Service field 622 may provide services provided by network 120. Service restriction field 620 may indicate restrictions on corresponding services in service field 622.

In the exemplary embodiment of FIG. 6, user privilege table includes two records 616 and 618 with the following usernames: SMITH and JONES. The corresponding entries in privilege field 614 indicates that username SMITH has PAYROLL and CALENDAR privileges and user JONES has CALENDAR privileges. In the exemplary embodiment of FIG. 6, service restriction table 620 includes a record 626 indicating that the PAYROLL service may only be accessed between 8 a.m. and 5 p.m.

Network Database Server

Figure 7:
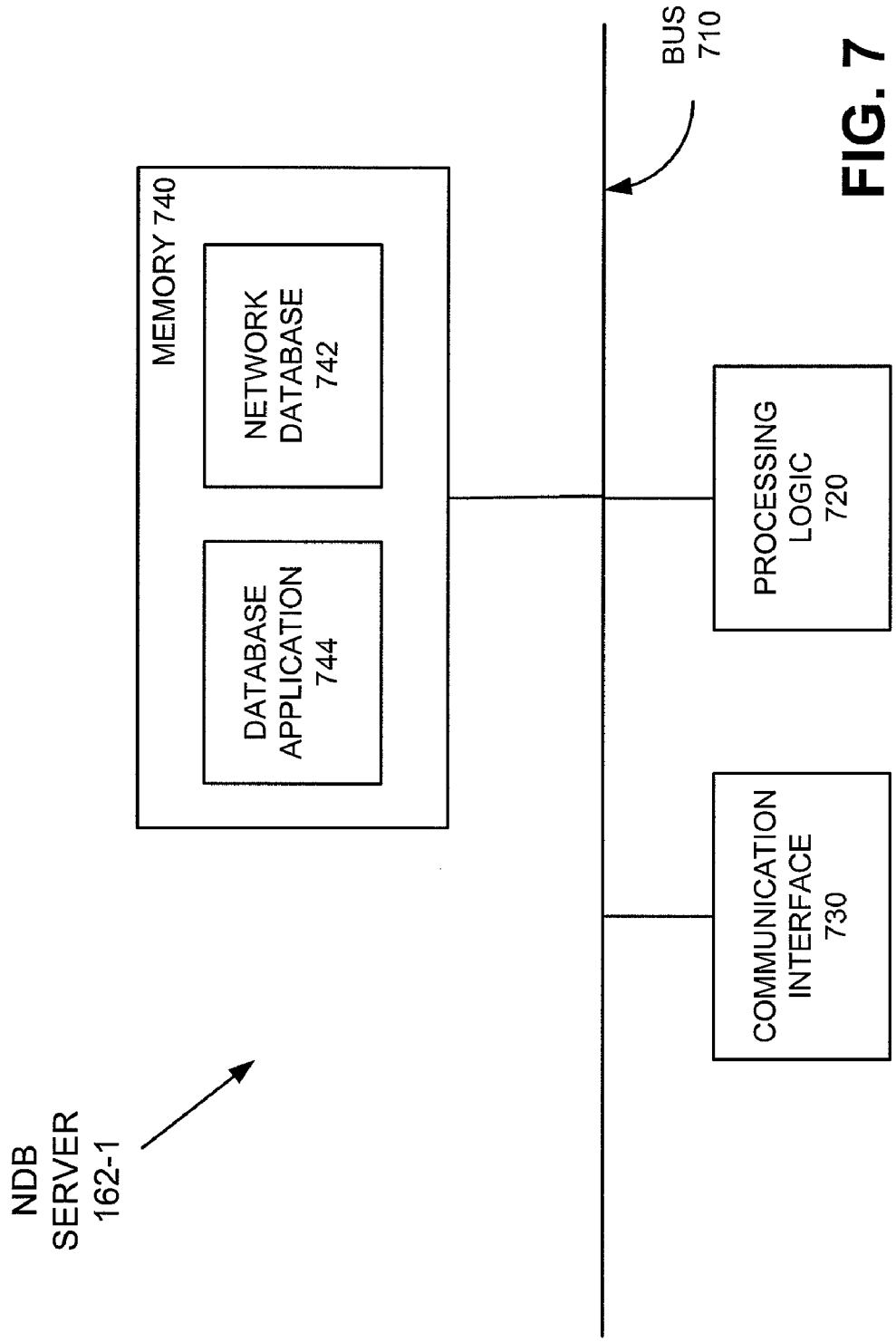
FIG. 7 is a block diagram of exemplary components in a network database server.

FIG. 7 is a block diagram of exemplary components in NDB server 162-1. NDB server 162-2 through NDB server 162-P may each be similarly configured. As shown in FIG. 7, NDB server 162-1 may include a bus 710, processing logic 720, a communication interface 730, and a memory 740. NDB server 162-1 may include other components (not shown) that aid in receiving, transmitting, and/or processing data. Moreover, other configurations of components in NDB server-1 are possible.

Bus 710 may include a path that permits communication among the components of NDB server 162-1. Processing logic 720 may include any type of processor or microprocessor that interprets and executes instructions. In other embodiments, processing logic 720 may include an ASIC, FPGA, or the like.

Communication interface 730 may include any transceiver-like mechanism that enables NDB server 162-1 to communicate with other devices and/or systems. Communication interface 730 may allow for NDB server 162-1 to be controlled and/or administered remotely by an operator or administrator.

Memory 740 may include a RAM or another type of dynamic storage device that may store information and instructions for execution by processing logic 720; a ROM device or another type of static storage device that may store static information and instructions for use by processing logic 720; and/or some other type of magnetic or optical recording medium and its corresponding drive for storing information and/or instructions. Memory 740 may store a network database 742, described below with respect to FIG. 8. Network database 742 may store information related to user device sessions, such as user device 110 and session 112, and network addresses. As mentioned above, network database 742 may be redundantly distributed among NDB servers 162-1 through 162-P. Memory 740 may store a database application 744 to manage network database 742.

NDB server 162-1 may perform certain operations, as described in detail below. NDB server 162-1 may perform these operations in response to processing logic 720 executing software instructions contained in a computer-readable medium, such as memory 740. The software instructions may be read into memory 740 from another computer-readable medium or from another device via communication interface 730. The software instructions contained in memory 740 may cause processing logic 720 to perform processes that are described below.

Figure 8:
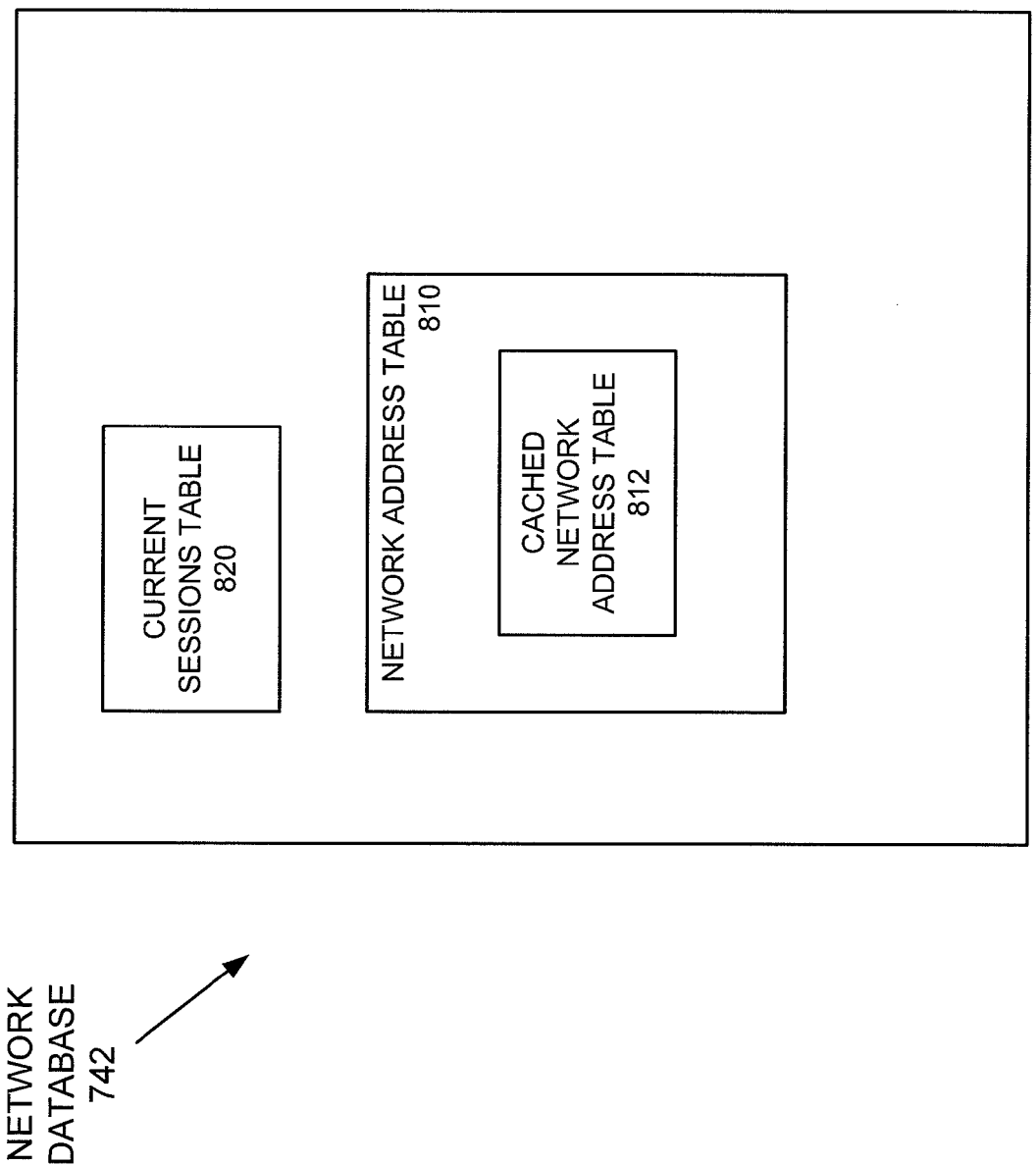
FIG. 8 is a diagram of an exemplary network database.

FIG. 8 is a diagram of exemplary network database 742. Network database 742 may include a current sessions table 820 ("CST 820") and network address table 810. Network database 742 may include different, more, or fewer tables. Network address table 810 may further include a cached network address table 812. In one exemplary embodiment, "state" information regarding sessions with user devices may be stored in network database 742. State information may include information about user device sessions. State information may include information needed for the continued functionality of RADIUS server 140 in environment 100 should any one of RADIUS servers 142-1 through 142-N fail. In one embodiment, CST 820 stores state information in network database 742. Storing state information in network database 742 may enhance availability because, as mentioned above, network database 742 may be distributed over more than one NDB server, such as NDB server 162-1 through NDB server 162-P. In another exemplary embodiment, state information is shared among RADIUS 140 and NDB server 160.

FIG. 9 is a diagram of exemplary network address table 810. As illustrated, network address table may 810 include a network address field 902, an address pool field 904, a cached field 906, a cached-to field 908, an assigned field 912, and a time freed field 916. Network address table 810 may include additional, different, or fewer fields than illustrated in FIG. 9.

Network address field 902 may include network addresses that NDB server 160 may provide or has provided to RADIUS server 140 when NDB server 160 receives a request, for example, from RADIUS server 140 for one or more network addresses. Address pool field 904 may indicate what pool (group) with which the corresponding network address from network address field 902 may be associated. For example, some network addresses may be reserved for particular usernames and may be placed in a pool.

Cached field 906 may indicate whether the corresponding network address from network address field 902 has been cached in RADIUS server 140. Cached-to field 908 may indicate which RADIUS server, such as RADIUS server 142-1 through RADIUS server 142-M, has cached the corresponding network address in network address field 902. In one embodiment, cached field 906 may indicate which RADIUS server, such as RADIUS server 142-1 through RADIUS server 142-M, has cached the corresponding network address field 902. In this embodiment, a value of zero in cached field 906 may indicate "NO," whereas a non-zero value may indicate which RADIUS server has cached the corresponding network address field 902.

Assigned field 912 may indicate whether the corresponding network address in network address field 902 has been assigned to a user device. Time freed field 916 may indicate the time at which the corresponding network address in network address field 902 was freed, e.g., the time when a user device using the corresponding network address ended the session and relinquished the network address.

In the exemplary embodiment of FIG. 9, network address table 810 includes eight records 918 through 932 with the following network addresses in network address field 410: 1.2.3.4, 1.2.3.5, 1.2.3.6, 1.2.3.7, 1.2.3.8, 1.2.3.9, 1.2.3.10, and 1.2.3.11. The corresponding entries in assigned field 912 indicate that all the network address are available, e.g., free, except for network address 1.2.3.7, which has been assigned to username SMITH. Network address table 810 also indicates that network addresses 1.2.3.4, 1.2.3.5, and 1.2.3.6 have been cached, as indicated in cached field 906, and cached to RADIUS server 142-1, as indicated in cached-to field 908. Cached field 906 also indicates that network addresses 1.2.3.7, 1.2.3.8, 1.2.3.9, 1.2.3.10, and 1.2.3.11 have not been cached in RADIUS server 140.

In the exemplary embodiment of FIG. 9, address pool field 904 may indicate that network addresses 1.2.3.4, 1.2.3.5, and 1.2.3.6 may be in the BLUE network address pool. Address pool field 904 also may indicate that network addresses 1.2.3.7, 1.2.3.8, 1.2.3.9, 1.2.3.10, and 1.2.3.11 may be in the GOLD network address pool. In another embodiment, address pool field 904 includes an integer value corresponding to a pool number. Time freed field 916 may indicate that network addresses 1.2.3.8, 1.2.3.9, 1.2.3.10, and 1.2.3.11 were each freed at 4:30 p.m.

FIG. 10 is an embodiment of exemplary CST 820. CST 820 may include session ID field 1002, creation time field 1004, expiration time field 1008, network address field 1010, network address pool field 1012, status field 1014, NAS ID field 1016, username field 1020, calling station ID field 1022, called station ID field 1024, and myRadAttr field 1026. In other implementations, CST 820 may include additional, different, or fewer fields than shown in FIG. 10.

Session ID field 1002 may include a unique identifier for a session. Creation time field 1004 may include the time that the session record was created. Expiration time field 1008 may include the expiration time that the session may be scheduled to end. Network address field 1010 may include the network address assigned to the user device. Network address pool field 1012 may indicate the pool with which the corresponding network address from network address field 1010 may be associated.

Status field 1014 may indicate the status of the session. For example, the status may be INACTIVE, PHANTOM, ACTIVE, or ZOMBIE. INACTIVE may indicate that the session has not begun and user device 110 has not been assigned a network address. PHANTOM may indicate that the session has not begun but that a network address has been assigned. ACTIVE may indicate that the session has begun and that a network address has been assigned. ZOMBIE may indicate that the session has ended, but that the session record remains for monitoring computer 170 to query, for example.

NAS ID field 1016 may indicate the NAS, such as NAS 132-1, with which the user device, such as user device 110, is communicating. Username field 1020 may indicate the username for user device 110, for example. NAS ID field 1016 and username field 1020 may be "cooked" data, meaning that RADIUS server 140 may process, use, or interpret the data.

Calling station ID field 1022 may indicate a cell tower from which a user device, such as user device 110, is placing a call. Called station ID field 1024 may indicate a cell tower to which a user device, such as user device 110, is placing a call. MyRadAttr field 1026 may be a field specified by the RADIUS protocol of the IETF. Calling station ID field 1022, called station ID field 1024, and myRadAttr field 1026 may be considered "raw" data, meaning that the data may pass from NAS 130 to NDB server 160 without RADIUS server 140 processing, using, or interpreting it. Calling station ID field 1022 may also indicate a central office, hub, gateway, or other network access point.

In the exemplary embodiment of FIG. 10, CST 820 stores information related to session A and session 112. CST 820 may store information related to more than two sessions. CST 820 may store information for sessions involving network 120.

Monitoring Computer

Figure 11:
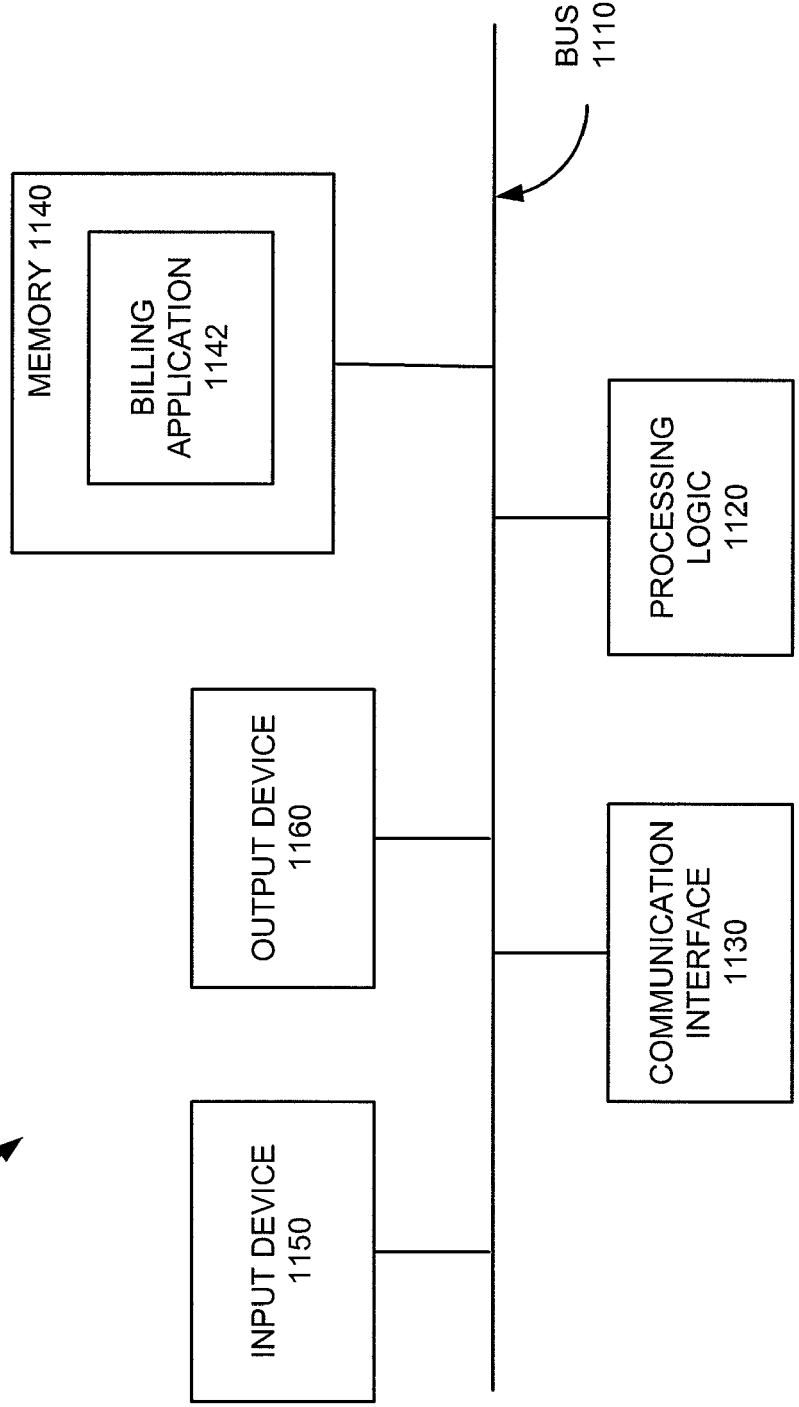
FIG. 11 is a block diagram of exemplary components in a monitoring computer.

FIG. 11 is a block diagram of exemplary components in monitoring computer 170. As shown in FIG. 11, monitoring computer 170 may include a bus 1110, processing logic 1120, a communication interface 1130, a memory 1140, input device 1150, and output device 1160. Monitoring computer 170 may include other components (not shown) that aid in receiving, transmitting, and/or processing data. Moreover, other configurations of components in monitoring computer 170 are possible.

Bus 1110 may include a path that permits communication among the components of monitoring computer 170. Processing logic 1120 may include any type of processor or microprocessor that interprets and executes instructions. In other embodiments, processing logic 1120 may include an ASIC, FPGA, or the like.

Communication interface 1130 may include any transceiver-like mechanism that enables monitoring computer 170 to communicate with other devices and/or systems. Memory 1140 may include a RAM or another type of dynamic storage device that may store information and instructions for execution by processing logic 1120; a ROM device or another type of static storage device that may store static information and instructions for use by processing logic 1120; and/or some other type of magnetic or optical recording medium and its corresponding drive for storing information and/or instructions. Memory 1140 may store a billing application 1142, for example. Billing application 1142 may allow monitoring computer 170 to query network database 742, including network address table 810 and CST 820 to generate bills for user devices, such as user device 110. Applications other than a billing application are possible.

Input device 1150 may include a device that permits a user to input information into monitoring computer 170, such as a keyboard, a keypad, a mouse, a pen, a microphone, one or more biometric mechanisms, or the like. Output device 1160 may include a device that outputs information to the user, such as a display, a printer, a speaker, etc.

Monitoring computer 170 may perform certain operations, as described in detail below. Monitoring computer 170 may perform these operations in response to processing logic 1120 executing software instructions contained in a computer-readable medium, such as memory 1140. The software instructions may be read into memory 1140 from another computer-readable medium or from another device via communication interface 1130. The software instructions contained in memory 1140 may cause processing logic 1120 to perform processes that are described below.

Exemplary Processing

Figure 12:
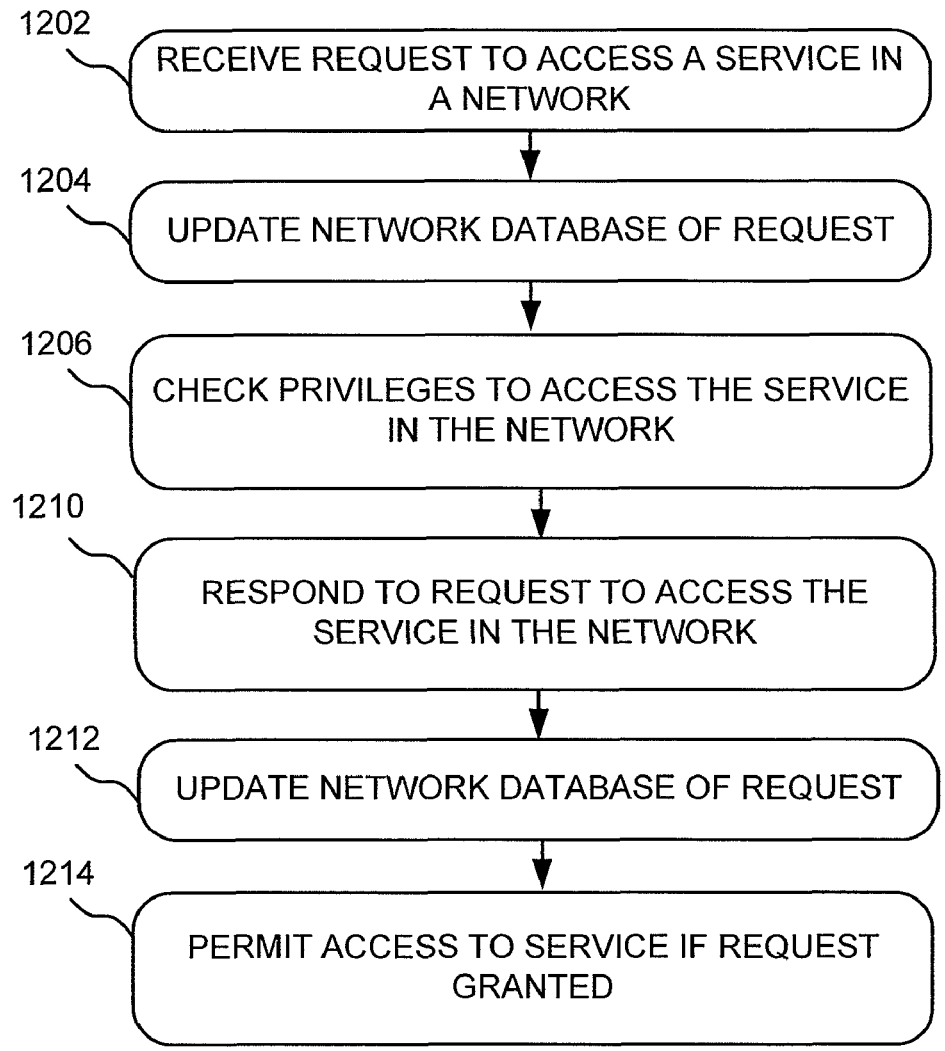
FIG. 12 is a flow chart of an exemplary process requesting access to a service in a network.

FIG. 12 is a flow chart of an exemplary process 1200 for requesting access to a service in network 120. A service may include a resource and/or data provided by network 120, for example. Exemplary process 1200 will be described in relation to exemplary environment 100. Process 1200 may begin with user device 110 attempting to access network 120 with an authentication request, e.g., a connection request. Process 1200 may also begin with user device 110, already connected to network 120, requesting access to a service in network 120. Process 1200 is first described with respect to an authentication request and then described with respect to an authorization request.

As shown in FIG. 12, a request to access a service in network 120 may be received (block 1202). As mentioned, the request may include an authentication request, where the "service" requested may be a connection and/or access to network 120. An authentication request may include a request for a network address. In this example, NAS 130 may receive the authentication request from user device 110 for a connection to network 120. NAS 130 may pass the request to RADIUS server 140. RADIUS server 140 may receive the request for access to the service in network 120. As part of the authentication request, user device 110 may identify itself with a password and a username, such as JONES.

Network database 742 may be updated (block 1204). RADIUS server 140 may notify NDB server 160 that a service was requested, e.g., that there was an authentication request. NDB server 160 may update network database 742 to indicate that a request has been made. For example, NDB server may create a CST 820 entry for username JONES.

Privileges to access the service in network 120 may be checked (block 1206). RADIUS server 140 may access user database server 150 to query user database 542 to authenticate user device 110 with username JONES, for example.

Figure 13:
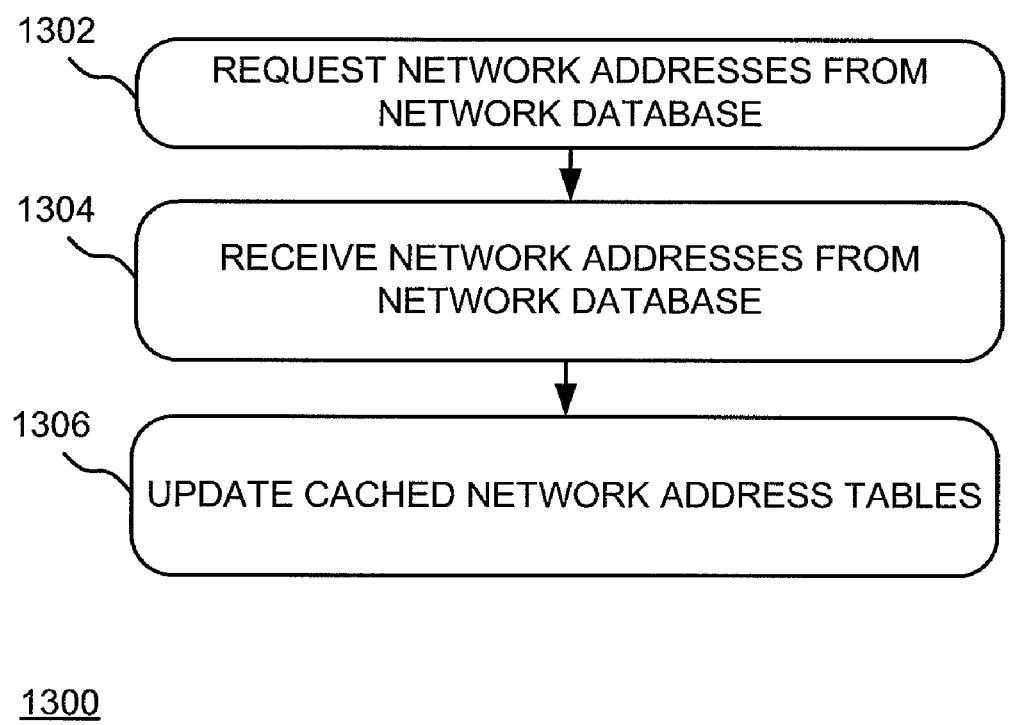
FIG. 13 is a flow chart of an exemplary process for caching network address.

A response to the request to access the service may be provided (block 1210). RADIUS server 140 may respond to NAS 130 with information regarding whether the authentication request should be granted or denied. If the request may be granted, the response may include a network address for the connection between user device 110 and network 120. To determine the network address, RADIUS server 140 may access cached network address table 344 and select an unassigned network address from network address table 344, such as network address 1.2.3.6. FIG. 13, described below, relates to a process for caching IP addresses in cached network address table 344. Alternatively, RADIUS server 140 may request a network address from NDB server 160 if cached network address table 344 does not have any available network addresses. RADIUS server 140 may also update network address table 344 to reflect that network address 1.2.3.6 has been assigned. NAS 130 may pass the response to user device 110 regarding whether the request was granted or denied.

Network database 742 may be updated (block 1212). RADIUS server 140 may notify NDB server 160 of the grant of the authentication request and the assignment of network address 1.2.3.6 to username JONES, for example. NDB server 160 may update network address table 810 indicating that network address 1.2.3.6 has been assigned. NDB server 160 may also update CST 820 indicating, for example, that user device 110 with username JONES has been assigned network address 1.2.3.6 and intends to establish a session.

Access to the requested service may be allowed, if the request was granted (block 1214). For example, if the request was granted, NAS 130 may respond to user device 110 by providing user device 110 with a network address that user device 110 may use to begin a session, such as session 112, with network 120. If the request is denied, access to the requested service may be denied and process 1200 may end.

As mentioned above, a received request may also include an authorization request. In this example, user device 110 may already have access to network 120 but may request access to a service, such as a payroll application, in network 120. The payroll application may provide an authorization request to NAS 130 regarding whether user device 110 has privileges to access the service, e.g., the payroll application. NAS 130 may receive the request for the service, e.g., the payroll application, from network 120. NAS 130 may send the request to access to the service to RADIUS server 140. RADIUS server 140 may receive the request for access to the service, e.g., the payroll application, in network 120.

RADIUS server 140 may notify NDB server 160 that a service was requested, e.g., that there was a request to access the payroll application. NDB server 160 may update network database 742 to indicate that a request has been made. For example, NDB server 160 may update session table 810 to indicate that user device 110 requested access to the payroll application.

RADIUS server 140 may access user database server 150 and query user database 542, such as user privilege table 610 or service restriction table 620. RADIUS server 140 may return the results of such a query to NAS 130. RADIUS server 140 and/or NAS 130 may determine that user SMITH has privileges to payroll application (as indicated in username privilege table 610). RADIUS server 140 and/or NAS 130 may also determine that user SMITH may access the payroll application because it is after 8 a.m. but before 5 p.m. (as indicated in service restriction table 620). RADIUS server 140 may determine that a username does not have privileges to payroll application when username privilege table 610, for example, does not include the username.

RADIUS server 140 may respond to NAS 130 with information indicative of whether the access request, e.g., authorization or authentication request, has been granted or denied. NAS 130 may respond to network 120 with information indicative of whether the access request has been granted or denied. In the case of an accounting request, RADIUS server 140 may indicate to NDB server 160 whether the accounting request was granted or denied, for example. NDB server 160 may, for example, update CST 820 to indicate that the request was granted or denied.

As discussed above with respect to FIG. 12, RADIUS server 140 may access cached network address table 344 and select an unassigned network address from network address table 344. FIG. 13 is a flow chart of an exemplary process 1300 for caching network address in cached network address table 344. A request for a number of network addresses may be made (block 1302). RADIUS server 140 may request a number, such as 10, of network addresses from NDB server 160. In one embodiment, RADIUS server 140 requests network addresses that have been free for more than a certain amount of time, such as five minutes. NDB server 160 may grant the request and provide the number of network addresses to RADIUS server 140 for caching. In one embodiment, NDB server 160 may access network address table 810 and may search time freed field 916. In this embodiment, NDB server 160 may grant the request by selecting network addresses that have been free for more than the amount of time specified by RADIUS server 140 in its request. In another embodiment NDB server 160 may grant the request by selecting the network addresses that have been free the longest amount of time. NDB server 160 may then send the selected network addresses to RADIUS server 140.

RADIUS server 140 may receive the selected network addresses (block 1304). The network address tables, such as cached network address table 344 and network address table 810 may be updated (block 1306). RADIUS server may update cached network address table 344. NDB server 160 may update cached field 906 in network address table 810 to indicate that the network addresses granted have been cached. NDB server 160 may also update cached-to field 908 to indicate which RADIUS server 140 has cached the granted network addresses.

RADIUS server 140 may update NDB server 160 at any time regarding any session established for any user device. For example, RADIUS server 140 may update NDB server 160 at accounting requests and corresponding responses and/or at access requests, e.g., authentication and authorization requests, and corresponding responses. RADIUS server 140 may update NDB server 160 at requests for a network address, or at any other time. RADIUS server 140 may update CST 820 with any information that CST 820 may store, including "state" information regarding sessions with user devices. As mentioned above, state information may include information needed for the continued functionality of RADIUS server 140 in environment 100 should any one of RADIUS servers 142-1 through 142-N fail. RADIUS server 140 may update CST 820 with "cooked" or "raw" information.

Information sent to NDB server 160 from RADIUS server 140 may be configurable information, meaning that RADIUS server 140 may send whatever information at whatever time an administrator requests. For example, an administrator may use monitoring computer 170 to configure CST 820 to include more, different, or fewer fields. An administrator may configure CST 820 to include, for example, a field for information regarding a bridge implementing a lightweight directory access protocol (LDAP) for SQL ("LDAP/SQL Bridge" or "LSB").

Monitoring computer 170 may then have access to NDB server 160 and the information stored in CST 820 and/or network address table 810. Monitoring computer 170 may, for example, use CST 820 for billing and/or other monitoring purposes. Monitoring computer 170 may access to CST 820 for a particular user device during a session or at a later time.

For example, monitoring computer 170 may have access to CST 820 for user device 110 during session 112 or after session 112 ends.

Network database server 160 and/or RADIUS server 140 may purge records in CST 820 on a regular basis after a period of time or after being instructed by monitoring computer 170. For example, a record, e.g., a session, may be purged when the expiration time in expiration time field 1008 has been reached. For a session with a PHANTOM status, expiration time field 1008 may be set so that the record may expire in a short time, such as three minutes. Expiration time field 1008 may be reset (e.g., for 24 hours later) when a session begins in earnest, e.g., when status field 1014 indicates ACTIVE. Expiration time field 1008 may be reset when a session ends, e.g., when status field 1014 indicates ZOMBIE, so that monitoring computer 170 may query NDB 160 before the record disappears. An expiration time of zero stored in expiration time field 1008 may indicate that the session may never expire.

User device 110 may end the session. For example, username JONES may end the session with network address 1.2.3.6 and user device 110 may notify NAS 130. NAS 130 may notify RADIUS server 140 that the session with network address 1.2.3.6 has ended. RADIUS server 140 may notify NDB server 1160 that the session with network address 1.2.3.6 has ended and NDB server 160 may update network address table 810 and CST 820 accordingly. For example, NDB server 160 may update time freed field 916 in network address table 810 with the time that network address 1.2.3.6 was freed. NDB server 160 may also update status field 1014 indicating that the session 112 has ended.

CONCLUSION

Implementations described herein may provide for a high-availability RADIUS server and network database. Further, implementations described herein may provide for access to current session information by a monitoring computer. Further, implementations described herein may provide network address caching for RADIUS servers.

The descriptions of FIGS. 2, 3, 5, 7, and 11 above each include a discussion of software instructions contained on computer-readable media. Alternatively, in each of these implementations, hardwired circuitry may be used in place of or in combination with software instructions to implement processes described herein. Thus, implementations described herein are not limited to any specific combination of hardware circuitry and software.

Although each of NAS 132-1, RADIUS server 142-1, and NDB server 162-1 may be controlled and/or administered remotely, each may also include an input device (not shown) that permits an operator/administrator to input information, control, or administer each server. Such an input device may include a keyboard, a keypad, a mouse, a pen, a microphone, or one or more biometric mechanisms. Further, each may also include an output device (not shown) that outputs information to the operator or administrator. Such an output device may include a display, a printer, a speaker, etc.

Although RADIUS server 140 and NDB server 160 are shown separately in FIG. 1A, in one embodiment they may be combined. For example, NDB server 162-1 may be combined with RADIUS server 142-1, NDB server 162-2 may be combined with RADIUS server 142-2, and so on.

It will be apparent that aspects, as described above, may be implemented in many different forms of software, firmware, and hardware in the implementations illustrated in the figures. The actual software code or specialized control hardware used to implement aspects is not limiting of the present invention. Thus, the operation and behavior of the aspects were described without reference to the specific software code—it being understood that software or control hardware could be designed to implement the aspects based on the description herein.

Further, although processes 1200 through 1300 in FIGS. 12 and 13 indicate a certain order of blocks, the blocks in these figures may be performed in any order. In addition, implementations described herein may use the internet-protocol (IP), asynchronous transfer mode (ATM) protocol, or any other type of network protocol. As such, implementations described herein may use IP addresses, ATM addresses, or any other type of network addresses.

In an alternative embodiment, assigned field 912 in IP address table 810 may indicate the number of times a user device has been assigned the corresponding network address in network address field 902. For example, a user device may be assigned the same IP address by multiple NAS devices such as when a mobile phone is passed from one cell tower to the next. Recording the number of times a user device has been assigned the corresponding network address may allow the recorded number to be decremented by one NAS device while not releasing the corresponding IP address. In yet another embodiment, assigned field 912 may also indicate to which username the corresponding network address in network address field 902 has been assigned.

As mentioned, network database 742 may include different, more, or fewer tables. For example, network database 742 may include a user-concurrency table that stores the current number of sessions for each user name or user device. In this embodiment, monitoring computer 170 may be able to monitor the number of concurrent sessions by a user or user device. In addition, RADIUS server 140, network database server 160, and user database server 150 may enforce a limit to the number of concurrent sessions by a user.

As shown above, IP addresses may be stored in a format such as 1.2.3.4. In another embodiment, IP addresses may be stored as an integer. In this embodiment, the integer that corresponds to an IP address of w.x.y.z may be represented by an integer resulting from the equation: $w*(256)^3+x*(256)^2+y*(256)^1+z*(256)^0$.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, in a first server and from a second server, a request for a connection between a device and a network;
sending, from the first server to a third server, a request for a plurality of network addresses;
receiving, in the first server and from the third server, the plurality of network addresses;
caching the plurality of network addresses in the first server;
storing, in a database of the third server, a plurality of entries, where each entry, of the plurality of entries, includes information regarding a particular network address, where the information indicates:
whether the particular network address has been cached by a particular server, an identity of the particular server that has cached the particular network address, when the network address has been cached, and whether the particular network address has been assigned to a particular device;

assigning, by the first server and in response to the request for the connection between the device and the network, a first network address, of the plurality of network addresses, to the device; and updating the database in the third server, upon assigning the first network address to the device, where the updating includes:

updating a first entry, of the plurality of entries, that is associated with the first network address, to indicate that the first network address has been assigned to the device.

2. The method of claim 1, further comprising sending state information about the connection to the third server for storage in the database, where the state information includes the one of the plurality of network addresses.

3. The method of claim 1, where receiving the plurality of network addresses includes receiving a plurality of network addresses that have not been assigned for a predetermined period of time.

4. The method of claim 1, further comprising:

using, by the third server, information, that is stored in the database and indicates that the first network address has been cached by the first server, to resume functionality of the first server when the first server fails.

5. A system comprising:

a first server to:
receive a request for a connection between a device and a network,
send a request for a plurality of network addresses
receive the plurality of network addresses, and
cache the plurality of network addresses;

a second server to:
receive the request for the plurality of network addresses from the first server;
store a plurality of entries, where a particular entry, of the plurality of entries, stores information regarding a particular network address, where the information indicates:
whether the particular network address has been cached by a particular server,
an identity of the particular server that has cached the particular network address, when the network address has been cached, and
whether the particular network address has been assigned to a particular device;

where the first server is further to:
assign, in response to the request for the connection between the device and the network, a first network address, of the plurality of network addresses, to the device; and where the second server is further to:
update a first entry, of the plurality of entries, that is associated with the first network address, to indicate that the first network address has been assigned to the device.

6. The system of claim 5, where the second server is further to store state information that includes a session identifier associated with the connection.

7. The system of claim 5, where the plurality of entries are redundantly distributed over a plurality of servers.

8. The system of claim 5, where the first server is further to send state information regarding the connection between the device and the network to the second server, where the state information includes the network address sent in reply to the request.

9. One or more non-transitory computer-readable memory devices having computer-executable instructions stored thereon, the computer-executable instructions comprising:

one or more instructions to receive, by a first server and from a second server, a request for a connection between a device and a network;

one or more instructions to send, from the first server and to a third server, a request for a plurality of network addresses;

one or more instructions to receive, by the first server, the plurality of network addresses;

one or more instructions to cache, by the first server, the plurality of network addresses;

one or more instructions to store, by the third server, a plurality of entries, where each entry, of the plurality of entries, includes information regarding a particular network address, where the information indicates:
whether the particular network address has been cached by a particular server,
an identity of the particular server that has cached the particular network address, when the network address has been cached, and
whether the particular network address has been assigned to a particular device;

one or more instructions to assign, by the first server and in response to the request for the connection between the device and the network, a first network address, of the plurality of network addresses, to the device; and one or more instructions to update, by the third server, a first entry, of the plurality of entries, that is associated with the first network address, to indicate that the first network address has been assigned to the device.

10. The one or more non-transitory computer-readable memory devices of claim 9, where the computer-executable instructions further comprise:

one or more instructions to send state information about the connection to the third server, where the state information includes the one of the plurality of network addresses.

11. The one or more non-transitory computer-readable memory devices of claim 9, where the one or more instructions to receive the plurality of network addresses include:

one or more instructions to receive a plurality of network addresses that have not been assigned for a predetermined period of time.

* * * * *

UNITED STATES PATENT AND TRADEMARK OFFICE
CERTIFICATE OF CORRECTION

| | | |
|---|---|---|
| PATENT NO. | : 8,072,990 B1 | |
| APPLICATION NO. | : 11/738095 | |
| DATED | : December 6, 2011 | |
| INVENTOR(S) | : Walter Tuvell et al. | |

It is certified that error appears in the above-identified patent and that said Letters Patent is hereby corrected as shown below:

Column 15, claim 5, line 34, change "addresses" to read --addresses,--.

Signed and Sealed this
Tenth Day of January, 2012

David J. Kappos
*Director of the United States Patent and Trademark Office*